United States Patent
Chester et al.

(10) Patent No.: US 8,712,968 B1
(45) Date of Patent: Apr. 29, 2014

(54) SYSTEMS AND METHODS FOR RESTORING IMAGES

(75) Inventors: Robert Chester, Auckland (NZ); Nigel David Anson Bree, Kaiwaka (NZ); Andrew Leslie Paxie, Auckland (NZ)

(73) Assignee: Symantec Corporation, Mountain View, CA (US)

( * ) Notice: Subject to any disclaimer, the term of this patent is extended or adjusted under 35 U.S.C. 154(b) by 785 days.

(21) Appl. No.: 12/503,176

(22) Filed: Jul. 15, 2009

(51) Int. Cl.
*G06F 17/00* (2006.01)

(52) U.S. Cl.
USPC .......................................... 707/649; 707/679

(58) Field of Classification Search
USPC ................................................ 707/647, 679
See application file for complete search history.

(56) References Cited

U.S. PATENT DOCUMENTS

| | | | | |
|---|---|---|---|---|
| 7,356,678 | B2 * | 4/2008 | Shaw et al. ........................ | 713/1 |
| 7,840,539 | B2 * | 11/2010 | Mooney et al. ................. | 707/674 |
| 2005/0050339 | A1 * | 3/2005 | Himmel et al. ................ | 713/189 |
| 2005/0240755 | A1 * | 10/2005 | Stein et al. ........................ | 713/1 |
| 2005/0289333 | A1 * | 12/2005 | Rothman et al. .................. | 713/1 |
| 2006/0161811 | A1 * | 7/2006 | Welts ............................. | 714/15 |
| 2007/0168478 | A1 * | 7/2007 | Crosbie .......................... | 709/221 |
| 2007/0180509 | A1 * | 8/2007 | Swartz et al. ..................... | 726/9 |
| 2007/0255698 | A1 * | 11/2007 | Kaminaga et al. ............ | 707/707 |
| 2008/0016304 | A1 * | 1/2008 | Witt et al. ...................... | 711/162 |
| 2008/0027998 | A1 * | 1/2008 | Hara .............................. | 707/707 |
| 2008/0082809 | A1 * | 4/2008 | Rothman et al. ................... | 713/1 |
| 2008/0120350 | A1 * | 5/2008 | Grabowski et al. ............ | 707/707 |
| 2009/0193102 | A1 * | 7/2009 | Trujillo ......................... | 709/220 |
| 2010/0030878 | A1 * | 2/2010 | Grabowski et al. ........... | 709/222 |
| 2010/0250877 | A1 * | 9/2010 | Gaither et al. ................. | 711/162 |
| 2010/0325277 | A1 * | 12/2010 | Muthiah et al. ............... | 709/226 |
| 2010/0325377 | A1 * | 12/2010 | Lango et al. .................. | 711/162 |
| 2011/0153644 | A1 * | 6/2011 | Kosuru et al. ................. | 707/769 |

OTHER PUBLICATIONS

Reload: Overview; accessed on Jul. 21, 2009; GAWAVA, Inc.; http://www.gwava.com/products/reload.html.

* cited by examiner

*Primary Examiner* — Robert Beausoliel, Jr.
*Assistant Examiner* — Alexandria Bromell
(74) *Attorney, Agent, or Firm* — ALG Intellectual Property, LLC

(57) ABSTRACT

A computer-implemented method may include identifying a request to restore an image to a target disk while a first operating system is running on the target disk and creating a file in a first file system of the first operating system. The method may also include mapping a position in the file to a location on the target disk to provide a map that associates the position in the file with the location on the target disk. The method may further include using the map to write at least a portion of the image to the target disk to provide a restored operating system on the target disk. Various other methods, systems, and computer-readable media are also disclosed.

20 Claims, 6 Drawing Sheets

SYSTEMS AND METHODS FOR RESTORING IMAGES

BACKGROUND

Conventional imaging solutions may use pre-Operating-System ("pre-OS") environments, such as DISK OPERATING SYSTEM ("DOS") and WINDOWS PREINSTALLATION ENVIRONMENT ("WINPE"), to restore images to target disks. Pre-OS environments are useful in image restoration because pre-OS environments typically allow an imaging solution to lock a volume so that an image may be written to the volume. However, there are various disadvantages to using a pre-OS environment to restore an image to a disk. One disadvantage of some pre-OS environments (e.g., DOS) is that certain drivers needed for restoring an image may not be available for the pre-OS environment. Another disadvantage of pre-OS environments is the difficulty of managing network connectivity in a pre-OS environment.

Unlike host operating systems, pre-OS environments are not aware of the host operating system's authentication mechanisms and the notion of user and machine identity on the network. As a result, a network infrastructure that requires authentication (e.g., most wireless networks and the 802.1x specification for secure wired Ethernet) cannot be used with a pre-OS. To work around the need for network connectivity during a pre-OS session, image restoration becomes a complicated two-step process that involves transferring the image to the host operating system and then entering the pre-OS and trying to restore the system in-place. This process may involve writing image data to disk twice, lengthening the recovery phase during which the system is unavailable. Furthermore, booting into a pre-OS without network connectivity typically results in a loss of management; therefore, the progress of image restoration (e.g., percent completed) and problems that arise during image restoration may not be reported to a central server or identified by an administrator. What is needed, therefore, is the ability to more efficiently restore images to disks and/or to maintain management of image restoration to enable reporting and/or failure remediation.

SUMMARY

As will be described in greater detail below, the instant disclosure generally relates to systems and methods for restoring images. Embodiments of the instant disclosure may use a running operating system, such as a host operating system, to restore an image to a target disk. For example, a computing system may identify a request to restore an image to a target disk while a first operating system is running on the target disk. The computing system may create a file in a first file system of the first operating system and map a position in the file (e.g., a file offset) to a location on the target disk (e.g., a disk sector) to provide a map that associates the position in the file with the location on the target disk. The computing system may then use the map to write at least a portion of the image to the target disk.

In certain embodiments, the target disk may be booted into a restored operating system included in the image. In some embodiments, to enable booting into the restored operating system, the computing system may update a boot record of the target disk to identify one or more partitions comprising the image. According to certain embodiments, the computing system may delete one or more files from the first file system to create sufficient free space for writing the image to the target disk. In various embodiments, the computing system may preserve a file from the first file system by making the file accessible via a file system of the restored operating system.

In various embodiments, the computing system may determine that a hardware driver of the first operating system is compatible with the restored operating system and may inject the hardware driver into the restored operating system. According to some embodiments, the system may reorganize data on the target disk to create space for file-system-meta-data of the restored operating system after file-system-meta-data of the first operating system and before any other data. The computing system may then write file system meta-data of the restored operating system to the space created for the file system meta-data of the restored operating system.

In some embodiments, the system may change a security identifier of the restored operating system before booting into the restored operating system. According to certain embodiments, creating a file in a first file system of the first operating system may include creating a file on each volume on the target disk that cannot be locked and mapping a position in the file to a location on the target disk may include mapping positions of each of the files created in the first file system to locations on the target disk. In such embodiments, using the map may include using the map to write at least a portion of the image to each volume on the target disk. In certain embodiments, the system may prevent defragmentation of any location on the target disk to which the image has been written.

In some embodiments, a system may include at least one processor and an identification module. The identification module may be programmed to direct the processor to identify a request to restore an image to a target disk while a first operating system is running on the target disk. The system may also include a file-management module programmed to direct the processor to create a file in a first file system of the first operating system and a mapping module programmed to direct the processor to map a position in the file to a location on the target disk to provide a map that associates the position in the file with the location on the target disk. The system may further include an imaging module programmed to direct the processor to use the map to write at least a portion of the image to the target disk and a boot module programmed to direct the processor to boot from the target disk into a restored operating system contained in the image.

In some embodiments, the imaging module may be programmed to direct the processor to update a boot record of the target disk to identify one or more partitions comprising the image, preserve a file from the first file system by making the file accessible via a file system of the restored operating system, determine that a hardware driver of the first operating system is compatible with the restored operating system, inject the hardware driver into the restored operating system, and/or change a security identifier of the restored operating system.

In certain embodiments, the file management module may be programmed to direct the processor to delete one or more files from the first file system to create sufficient free space for writing the image to the target disk, reorganize data on the target disk to create space for file-system-meta-data of the restored operating system after file-system-meta-data of the first operating system and before any other data, and/or write file system meta-data of the restored operating system to the space created for the file system meta-data of the restored operating system.

According to various embodiments, a computer-readable-storage medium may include one or more computer-executable instructions that, when executed by a computing device, cause the computing device to identify a request to restore an image to a target disk while a first operating system is running on the target disk, create a file in a first file system of the first operating system, map a position in the file to a location on the target disk to provide a map that associates the position in the file with the location on the target disk, use the map to write at least a portion of the image to the target disk, and boot from the target disk into an operating system contained in the image. In some embodiments the one or more computer-executable instructions are programmed to cause the computing device to, before booting into the operating system contained in the image, update a boot record of the target disk to identify one or more partitions comprising the image. According to certain embodiments, the one or more computer-executable instructions are programmed to cause the computing device to preserve a file from the first file system by making the file accessible via a file system of the operating system contained in the image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
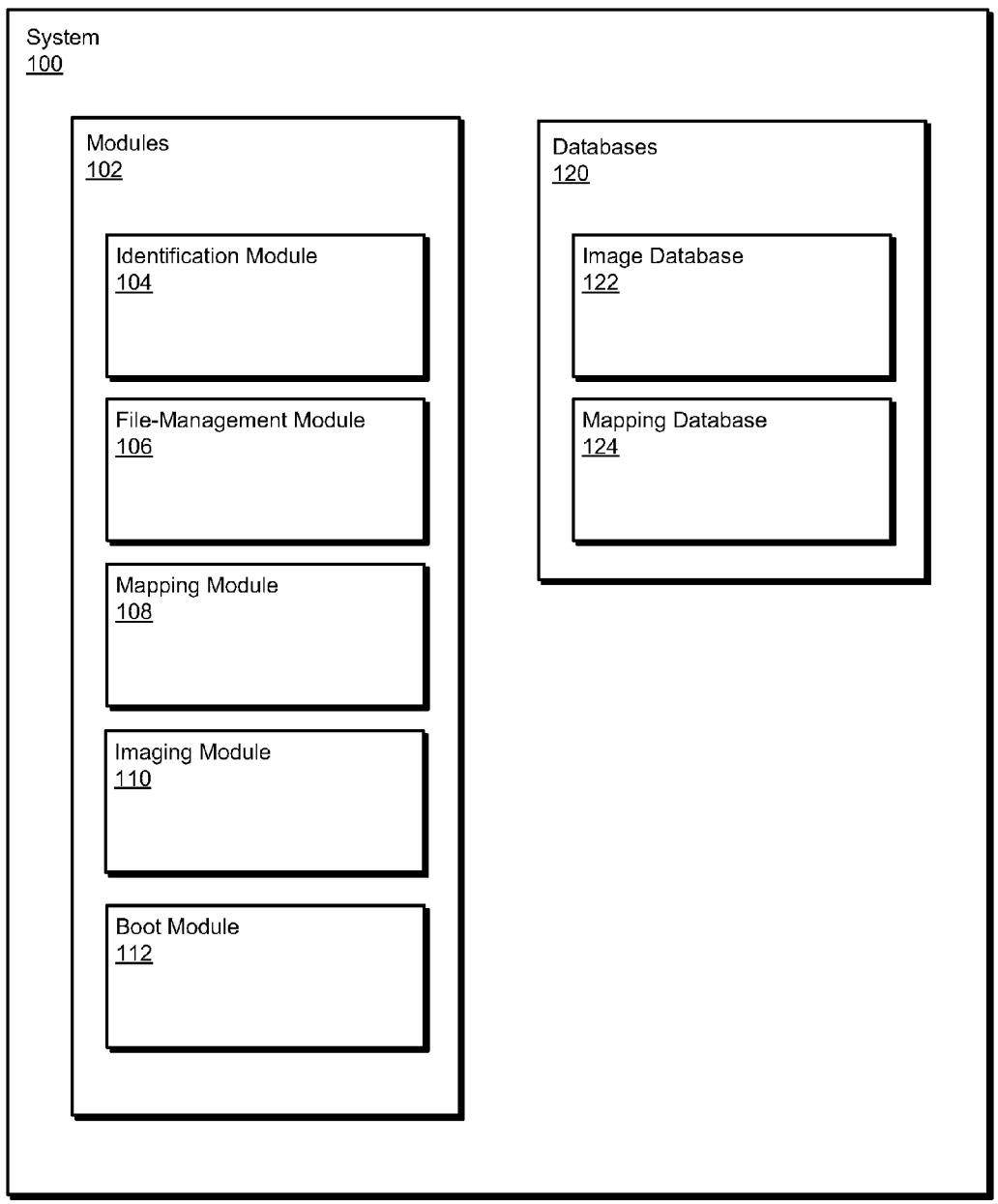
FIG. 1 is a block diagram of various modules and databases of an exemplary system for restoring images.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for restoring images. Embodiments of the instant disclosure may enable an image to be restored to a computer while the computer is running a first operating system. An image may be restored while the first operating system is running by creating and writing to an operating system file (e.g., a file of a file-system of the first operating system). The operating system file may be written to by using a map that associates the file with locations on a target disk. Embodiments of the instant disclosure may enable images to be restored without running a pre-OS. Embodiments of the instant disclosure may also provide various other features and advantages, as described in greater detail below.

Figure 2:
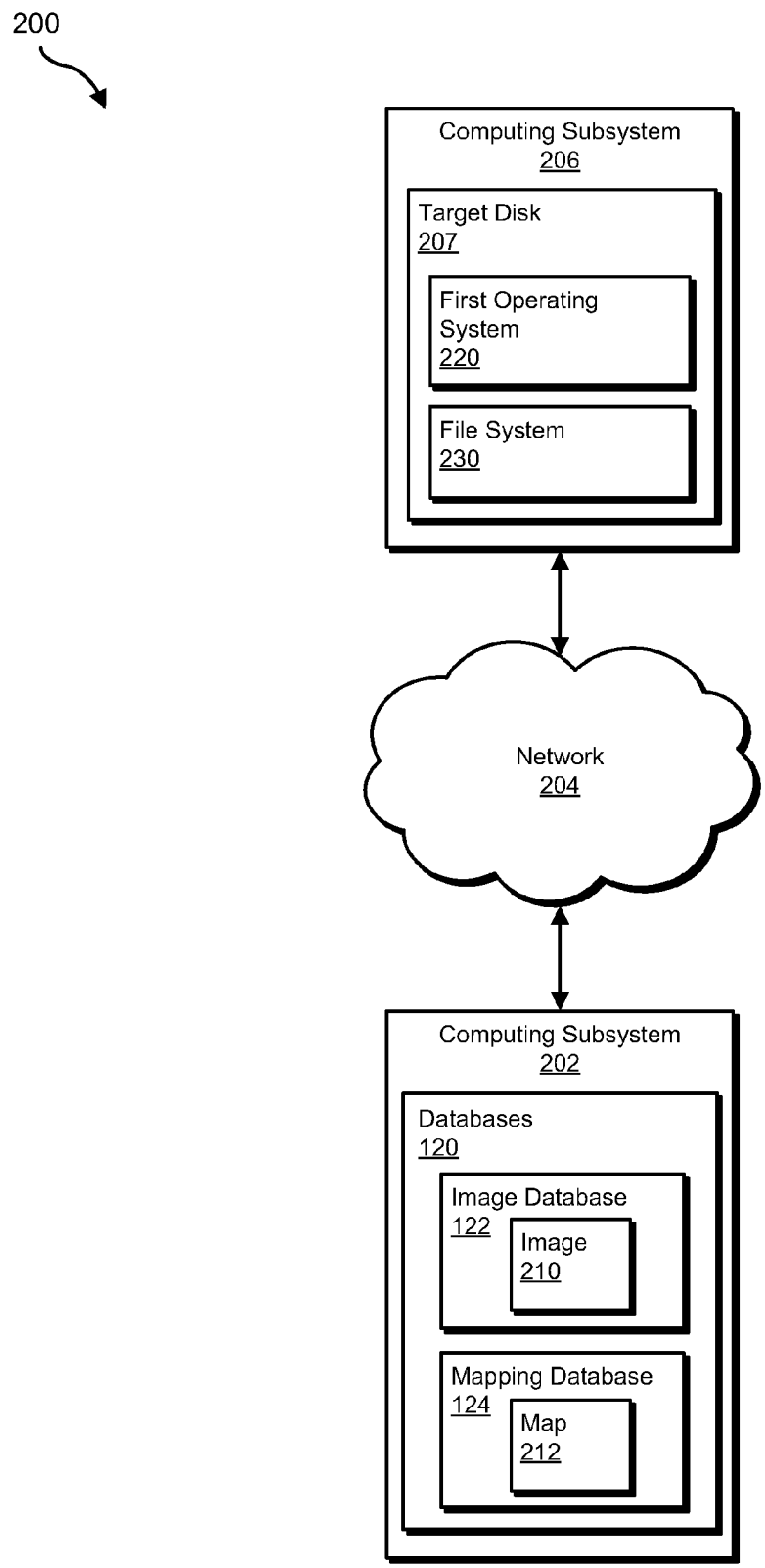
FIG. 2 is a block diagram of an exemplary system with more than one computing subsystem connected via a network for restoring images.
Figure 3:
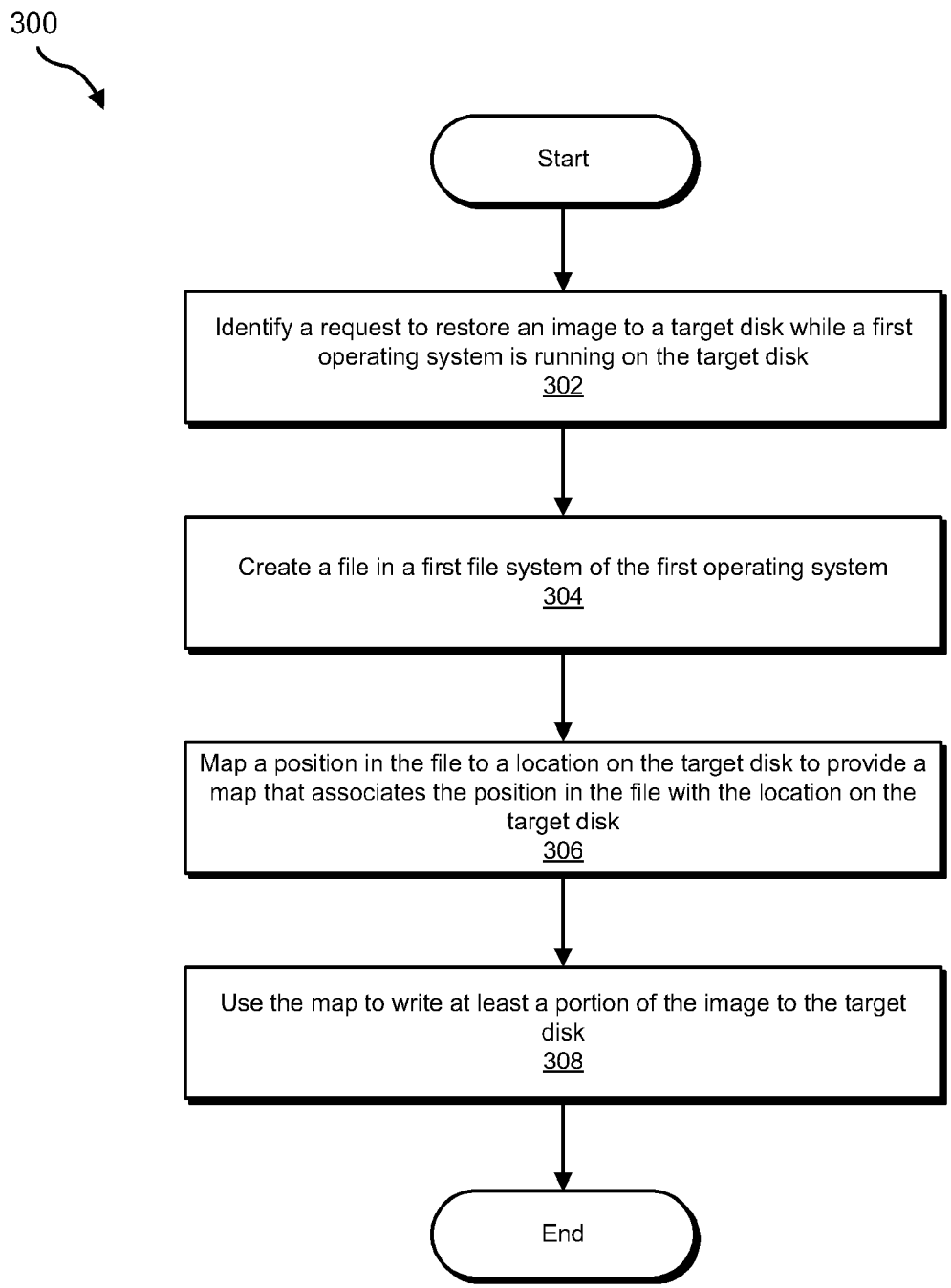
FIG. 3 is a flow diagram of an exemplary method for restoring images.
Figure 4:
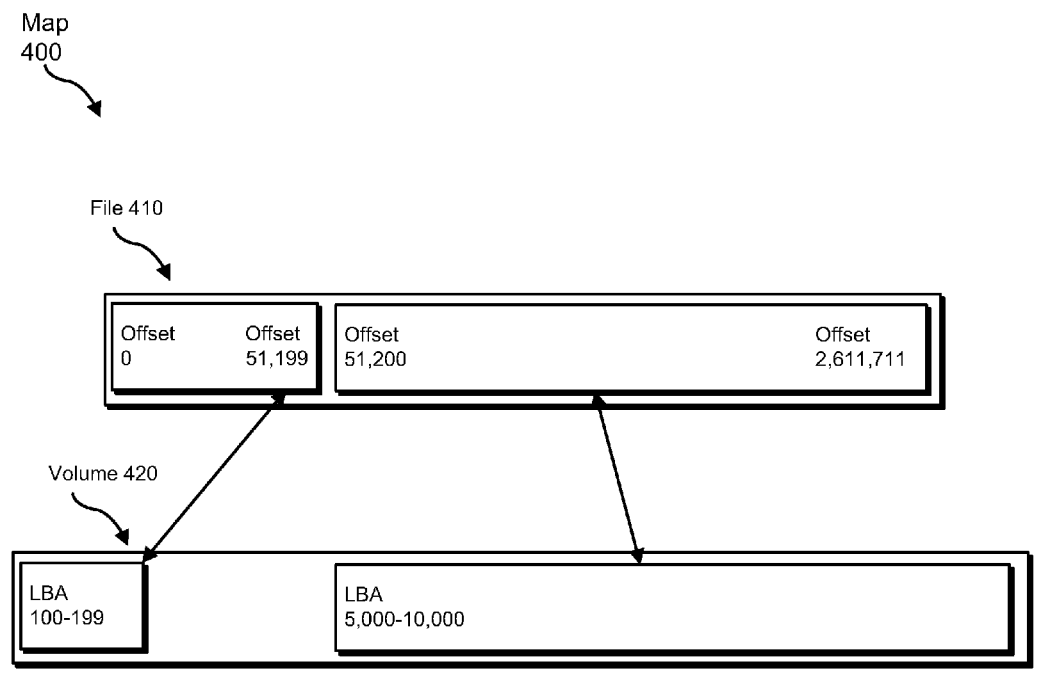
FIG. 4 is a block diagram of an exemplary map for associating positions in a file to locations on a disk.

The following will provide, with reference to FIGS. 1-2, detailed descriptions of exemplary systems for restoring images Detailed descriptions of corresponding computer-implemented methods will also be provided in connection with FIG. 3, and detailed descriptions of exemplary imaging maps are provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for restoring images. As illustrated in this figure, exemplary system 100 may include one or more modules 102 for performing one or more tasks. For example, and as will be explained in greater detail below, exemplary system 100 may include an identification module 104 programmed to identify a request to restore an image to a target disk while a first operating system is running on the target disk. Exemplary system 100 may also include a file-management module 106 programmed to create a file in a first file system of the first operating system. Exemplary system 100 may include a mapping module 108 programmed to map a position in the file to a location on the target disk to provide a map that associates the position in the file with the location on the target disk. Exemplary system 100 may further include an imaging module 110 programmed to use the map to write at least a portion of the image to the target disk and a boot module 112 programmed to boot from the target disk into a restored operating system included in the image. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystem 202 and/or computing subsystem 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include an image database 122 that stores one or more images and a mapping database 124 that stores one or more maps. Databases 120 in FIG. 1 may represent a portion of one or more computing devices. For example, databases 120 may represent a portion of computing subsystem 202 and/or 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as computing subsystems 202 and/or 206 in FIG. 2 computing system 510 in FIG. 5 and/or portions of exemplary network architecture 600 in FIG. 6.

FIG. 2 is a block diagram of an exemplary system 200 for restoring images. As illustrated in this figure, exemplary system 200 may include a computing subsystem 202 in communication with a computing subsystem 206 via a network 204. Computing subsystem 202 may include modules 102 and databases 120. Image database 122 may include an image 210, and mapping database 124 may include a map 212. Computing subsystem 206 may include a target disk 207 that includes a first operating system 220 and a file system 230. As used herein, the term "target disk" may refer to any storage media to which an image may be written.

In one embodiment, computing subsystem 202 may be a computing system configured to restore an image to computing subsystem 206. For example, computing subsystem 202 may be an administrator's computing system, a server, and/or any other computing system capable of restoring one or more images. In some embodiments, computing subsystem 206 may be a target computing system to which an image may be restored. For example, computing subsystem 206 may be an endpoint, such as an end user's computing system.

Computing subsystems 202 and 206 generally represent any type or form of computing device capable of reading computer-executable instructions. Examples of computing subsystems 202 and 206 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 206 may facilitate communication or data transfer using wireless or wired connections.

FIG. 3 is a flow diagram of an exemplary computer-implemented method 300 for restoring images. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. At step 302 identification module 104 may, as part of computing subsystem 220, identify a request to restore an image to a target disk while a first operating system is running on the target disk. For example, identification module 104 may identify a request to restore image 210 to target disk 207. Identification module 104 may identify the request in a variety of manners. For example, the request to restore the image may be a request made by or to an imaging software program. The request may be any request to provide an image to a target disk. In some embodiments, the request may be made while a host operating system is running on a target disk.

As used herein, the term "image" generally refers any source for restoring an operating system and/or other file system data to a target disk. An image may include one or more files that include contents and/or structure of a data storage medium or device. For example, an image may include a file that replicates the structure and contents of a storage device. In other examples of the instant disclosure, the source of a restoration operation (i.e., an image) may refer to an existing disk, partition, or volume.

In some embodiments, an image may be created in any suitable manner by any suitable imaging solution. For example, an image may be creating by performing a complete sector-by-sector copy of a source medium (e.g., a hard disk). Images may be used for backup, restoration, rollout, and/or various other purposes. In some embodiments, an image may be local to the target disk or residing on the target disk. In other embodiments, the image may be accessible across as network.

As used herein, the phrase "operating system" generally refers to any operating system or operating system environment installed on a target disk, including pre-OS environments, host operating systems, and/or any other operating systems. As used herein, the phrase "host operating system" generally refers to a full operating system capable of managing resources of a target disk on behalf of user applications, including imaging applications, and may prevent certain operations on the target disk that imaging applications require to complete image restores (e.g. preventing writes to certain regions of the target disk.) The phrase "host operating system" excludes pre-OS environments. Examples of host operating systems include WINDOWS XP, WINDOWS VISTA, WINDOWS 7, MAC OS X, LINUX, UNIX, and a variety of other operating systems. In certain embodiments, the first operating system is a host operating system.

At step 304, file-management module 106 may create a file in a first file system of the first operating system. For example, file-management module 106 may create a file in file system 230 on computing subsystem 206. The file may be used as a mechanism to write sectors on the target disk to restore the image. In other words, creating the file may allocate storage in the first operating system that may be used for image restoration independent of the host OS.

The file created in step 304 may be any file created within a file system managed by an operating system. In other words, the file created in step 304 is an "ordinary" file. In contrast, the file created in step 304 is not a "special file" (e.g., a storage entity created by a WINDOWS CREATEFILE function) created by direct access to a disk or volume outside of the file system managed by the first operating system.

At step 306, mapping module 108 may map a position in the file to a location on the target disk to provide a map that associates the position in the file with the location on the target disk. For example, mapping module 108 may create a map in mapping database 124 that maps a position (e.g., a file offset) in the file to a location (e.g. a sector) on the target disk. FIG. 4 shows an exemplary embodiment of a map that associates file offsets with disk sectors. By associating positions in a file to locations on a disk, mapping module 108 may enable imaging module 110 to write an image to the disk.

In some embodiments, the file may include a contiguous storage extent (i.e., the file may not be fragmented). If the target disk does not have an extent large enough to hold the file, file management module 106 (which may include a defragmentation tool) may attempt to create an extent large enough for the file. Alternatively, embodiments of the instant disclosure may enable the file to be divided up among multiple storage extents. Thus, the file may include one or more underlying storage extents (i.e., the file may be fragmented). In embodiments where the underlying storage extents are not contiguous, the area between the extents may be represented by using a bad-block mapping facility of a file system within the file (i.e., a file system of an image written to the file) to comment out the disk region lying between the file extents that the first operating system allocated for the image. Additionally or alternatively, a file system within the file may represent these areas of the disk as files constructed in the inner file system (i.e., the file system within the file).

When the file is fragmented, the first operating system may or may not allocate the fragments in order at sequentially increasing disk locations. When the first operating system does not allocate the fragments in order at sequentially increasing disk locations, the mapping of file positions to disk locations may be used to sort the extents on the disk into on-disk order and/or to build an inner file system (i.e., a file system of the file) based on this order.

The map created by mapping module 108 may be stored in the file. By capturing the map persistently (i.e., storing the map in the file), the content in the file may be mounted and accessed even if third-party tools modify the mapping or the storage file is copied to other media. Furthermore, in some embodiments, the map may be used to extend the underlying storage extend beyond multiple extents of a disk within one file system to additional storage space allocated from any volume on the disk and/or storage space that is not allocated to any disk partition (i.e., unallocated storage space). In other words, embodiments of the instant disclosure may create space for restoring an image by mapping to unallocated areas on a disk and/or joining together multiple files within a single volume of the disk and/or stored on separate volumes of the disk. Creating more than one file in a file system to address underlying volume sectors may be particularly useful for some file systems. Some file systems, such as FAT32, may have a maximum file size that is less than the total size of the file system (e.g. a 32 GB FAT32 file system with the maximum FAT32 file size being 4 GB).

Allowing the image to be split among different files and/or file systems solves constraints of traditional imaging solutions that require a large block of unmovable contiguous storage to restore an image. In addition to enabling image restoration to fragmented disk locations, embodiments of the instant disclosure may provide disk layout that provides some free space for potential partition boundaries within the file. A single file, or a collection of files on a volume that are logically connected by a map, may be referred to as a segment. Similarly, a collection of extents defined by a sequence of segments in separate volumes on the underlying physical disk may be referred to as a segment set.

In some embodiments, file-management module 106 may prevent defragmentation of any location on the target disk to which the image has been written. In other words, file-management module 106 may prevent the first operating system from performing defragmentation after the image has been written because defragmentation may render the mapping between the file and the disk unusable. In some embodiments, file-management module 106 may prevent the first operating system from performing defragmentation on one or more file(s) containing the image by marking the file or files as unavailable for defragmentation. In some embodiments, file-management module 106 may also prevent the first operating system from defragmenting one or more files on the first file system that are to be preserved in the restored file system.

After the map is created, imaging module 110 may use the map to write at least a portion of the image to the target disk at step 308. In other words, imaging module 110 may write all of the image to the target disk or any portion of the image to the target disk. For example, imaging module 110 may use map 212 to write image 210 to target disk 207 through file system 230. In other words, map 212 may provide imaging module 110 with direct access to a disk underlying a file system. In writing the image to file (or files) of the target disk, imaging module 110 may provide a restored operating system (i.e., an operating system of the image) in the file. In addition to or instead of including a restored OS, the image may include a file system. Thus, by writing the image to the file, imaging module 110 may create a file system in the file, which may be referred to as an inner file system.

In some embodiments, imaging module 110 may preserve a file from the file system of the first operating system by making the file accessible via a file system of the image. For example, the content of preserved files may be merged into the restored file system. In some embodiments, files may be preserved by copying the files from the file system of the first operating system to the restored file system. Alternatively, a file may be preserved by modifying the restored file system to point to the file in its original location in the host file system. In some embodiments, a user may be able to designate one or more files that are to be preserved.

Imaging module 110 may reorganize data on the target disk to create space for file-system metadata (e.g., a boot sector) of the restored operating system after file-system metadata of the first operating system and before any other data. Imaging module 110 may use reorganization functionality (e.g., a data reorganization Application Programming Interface ("API")) of the first operating system to provide space for the metadata of the restored file system. By placing metadata of the restored file system as close to start of the disk as possible, imaging module 110 may minimize the amount of disk space that is unusable when the restored operating system is made permanent on the target disk (i.e., when the first operating system is no longer available). In some embodiments, the space before the restored file system meta-data may be recovered by using any suitable on-line technique. In certain embodiments, instead of reorganizing the data on the target disk before the image is written the target disk, the data on the target disk may be reorganized after the image is written to the target disk. For example, imaging module 100 may move the file-system metadata of the restored file system to (or near) the front of the disk after the restored operating system boots for the first time.

In some embodiments, imaging module 110 may delete one or more files from the file system of the first operating system to create sufficient free space for writing the image to the target disk. For example, if the target disk does not contain sufficient free space for writing the image to the target disk, imaging module 110 may delete one or more files from the file system of the host OS. Imaging module 110 may attempt to first delete non-critical files to allow at least a partial roll-back of the image restoration.

One advantage of restoring an image to a disk with a running operating system is that imaging module 110 may use one or more hardware drivers of the running operating system for the restored OS. For example, imaging module 110 may determine that a hardware driver of the first operating system is compatible with the restored operating system and may then inject the hardware driver into the restored operating system. This process may be performed for any type of driver, including I/O device drivers, network device drivers, storage device drivers, and/or various other types of drivers. Thus, the host operating system may be leveraged as a source of drivers to be injected into the restored operating system to ensure that the restored operating system may be successfully booted.

In some embodiments, boot module 112 may boot from the target disk into a restored operating system contained in the image. In other words, the target disk may be booted from the restored operating system rather than the first operating system. In some embodiments, the target disk may be booted from the restored operating system immediately after the restored operating system is written to the target disk. In other embodiments, the target disk may be booted from the restored operating system at a later point in time.

In situations where activation (i.e., booting from) the restored operating system is delayed, multiple images may be restored and not yet activated. In such situations, each image may include a file system that uses bad block mappings to identify which sectors are available to a particular segment set (i.e., restored image). A user may then be able to choose which image is activated and at that point the partition table (e.g., MBR) may be updated and the system rebooted such that the new (i.e., restored) operating system would start. When an image is activated, information about the first operating system may be created and stored in the restored file system(s) such that after booting into the restored operating system a user may be able to activate and boot back into the first operating system.

When activation of a restored image is deferred, the map of file positions to disk locations may be used to determine whether the file(s) of the restored image are still valid (e.g., to ensure that they have not been copied to a new system or to determine that a defragmentation tool has not moved sector locations from within a pre-OS or other environment.)

In some embodiments, during restoration of an image the first operating system environment may remain operational. Thus, a user may continue working on the system and booting into the new operating system may be deferred. For example, while a user is still working, an image restoration could proceed as a test of a backup and once checks had been done on the restored system, the file(s) used to write the image to the disk could simply be deleted. In such situations, the restored operating system may never be activated. Alternately, as previously noted, the restored operating system may not be activated (i.e., booted into) until sometime in the future (e.g., when a class of students is about to begin a lesson in a computer based training situation).

In some embodiments, before booting into the restored operating system, imaging module 110 may update or replace a boot record of the target disk to identify one or more partitions comprising the image. For example, imaging module 110 may update a master boot record to identify one or more partitions or volumes that includes the image. Alternatively, when the underlying disk format is changed in a restored operating system, imaging module 110 may replace the boot record of the target disk. For example, a disk that was previously formatted as GUID Partition Table ("GPT") could be changed to be formatted as Master Boot Record ("MBR"). In such situations, a new partition scheme may be created and populated with the partition or partitions that have been restored.

Furthermore, to enable booting of the restored operating system on some systems, such as Unified Extensible Firmware Interface ("UEFI") systems, in addition to partition identification the system may need to receive additional updates. For example, EFI or UEFI Non-Volatile Random Access Memory ("NVRAM") boot variables may need to be updated to identify the newly restored partition(s). Other boot information may also need to be updated, such as boot configuration data (e.g., VISTA boot manager BCD). Additionally or alternatively, imaging module 110 may change a security identifier of the restored operating system before the restored operating system is booted.

In some embodiments, the image may be an archived image that is restored to the target disk and may be unrelated to the first operating system. In other embodiments, the image may be a volume snapshot taken of the first operating system. In this example, the image may not be immediately activated. Instead, the image may be stored as a warm standby that can be immediately activated to replace the primary first operating system if the first operating system fails due to a transient condition (e.g., compromise by malware, failure of an operating system software upgrade, etc.). A warm standby image may also be useful for handling permanent hardware failures. The warm-standby image may be useful in such situations because the structure of a warm-standby image may contain more meta-data redundancy than the first operating system (in particular, redundancy designed to be discoverable via block-level scanning) thereby allowing more data to be recoverable even after severe failures.

A warm standby image may be activated by making it available for use as a file system by placing one or more partition entries referring to the image within the physical disk's partitioning structure or structures. The warm standby image may be deactivated by returning to the first file system structure on the physical disk. According to certain embodiments, the warm standby image may function like a persistent volume snapshot, allowing a secondary process which copies from the warm standby into a classic archive for offline or remote storage for recovery from permanent hardware failure.

Embodiments of the instant disclosure may provide for multiple warm standby images and/or other dynamic volumes on a disk. Such dynamic volumes may overlap each other, effectively providing different virtual views on the underlying storage. For instance, in a task where a restored image requires scripted customization from MS-DOS, WINDOWS, and LINUX tools, the image could be restored as a single dynamic volume that is subsequently sub-partitioned or by having three separate dynamic volumes.

Whether a dynamic volume is intended to be transient and have its space reclaimed once it becomes inactive or is intended to be preserved permanently (i.e., when an image is permanently restored) may be an explicit attribute of the dynamic volume. Because some operating systems do not allow overlapping partitions to exist on a physical disk, it may be important to ensure that only a single dynamic volume file system is activated at any one time (e.g., by being referred to as a partition in the physical disk's partition table).

In certain embodiments, a recovered operating system may not be permanently activated. This provides for rapid end-to-end testing of the recovery process. Many traditional restoration processes may not be able to test end-to-end because of the time-consuming nature of traditional recovery processes. Thus, traditional restoration processes may settle for low-level integrity checks on the recovery media. In contrast, images restored as dynamic volumes may be quickly restored and quickly discarded (or deactivated), thereby allowing for more significant testing of recovered data and more efficient rollback of recovered data when issues are detected in the recovered data. Indeed, embodiments of the instant disclosure may restore an image into one or more files in a file system for the purpose of allowing the imaging operation to be rolled back. Such an approach may be effective in restoring images in full operating system environments and/or pre-OS environments. Embodiments of the instant disclosure also allow for more efficient disaster simulations, trial recoveries, and training sessions for IT staff (i.e., direct and/or dynamic image recovery may allow for rapid provisioning of new classroom situations from a primary host operating system on short notice).

As noted, embodiments of the instant disclosure may allow an image to be restored to a volume that cannot be locked. In some embodiments, multiple volumes on a target disk may not be able to be locked. In such embodiments, file management module 106 may create a file on each volume on the target disk that cannot be locked, mapping module 108 may map positions of each of the files created in the file system to locations on the target disk, and imaging module 110 may use the mapping to write at least a portion of the image to each volume on the target disk.

As previously noted, embodiments of the instant disclosure may also provide for rollback of a restored image. Since the first operating system may be preserved even after the image is written to the target disk, the target disk may be booted into the first operating system even after the image is written to the target disk.

FIG. 4 is a block diagram of an exemplary map 400 that maps positions of a file to locations on a target disk. FIG. 4 shows a file 410 and a volume 420. File 410 may have an offset 0, an offset 51,199, an offset 51,200, and an offset 2,611,711. Volume 420 includes Logical Block Addresses ("LBAs") of 100-199 and 5,000-10,000. As shown in FIG. 4, map 400 may associate offsets 0-51,199 with LBAs 100-199 and offsets 51,200-2,611,711 with LBAs 5,000-10,000. Map 400 shown in FIG. 4 is exemplary and various other types of maps with any number of file position/disk location associations fall within the scope of the instant disclosure.

Map 400 may include any type of data capable of representing associations between positions of a file and locations on a target disk. For example, map 400 may be a text file, a database file, and/or any type of file that contains a representation of one or more associations between one or more positions of a file and one or more locations on a target disk. As another example, map 400 may be represented in a memory data structure without use of any external storage.

In some embodiments, as an alternative to creating a file and mapping file positions to disk locations to restore an image, imaging module 110 may cause the first operating system to mark one or more regions (e.g., clusters) of the target disk as bad and then write the image to them directly (e.g., by writing to a disk or volume file behind the live file system). Imaging module 110 may use an API of the target operating system to mark a disk region as bad.

Figure 5:
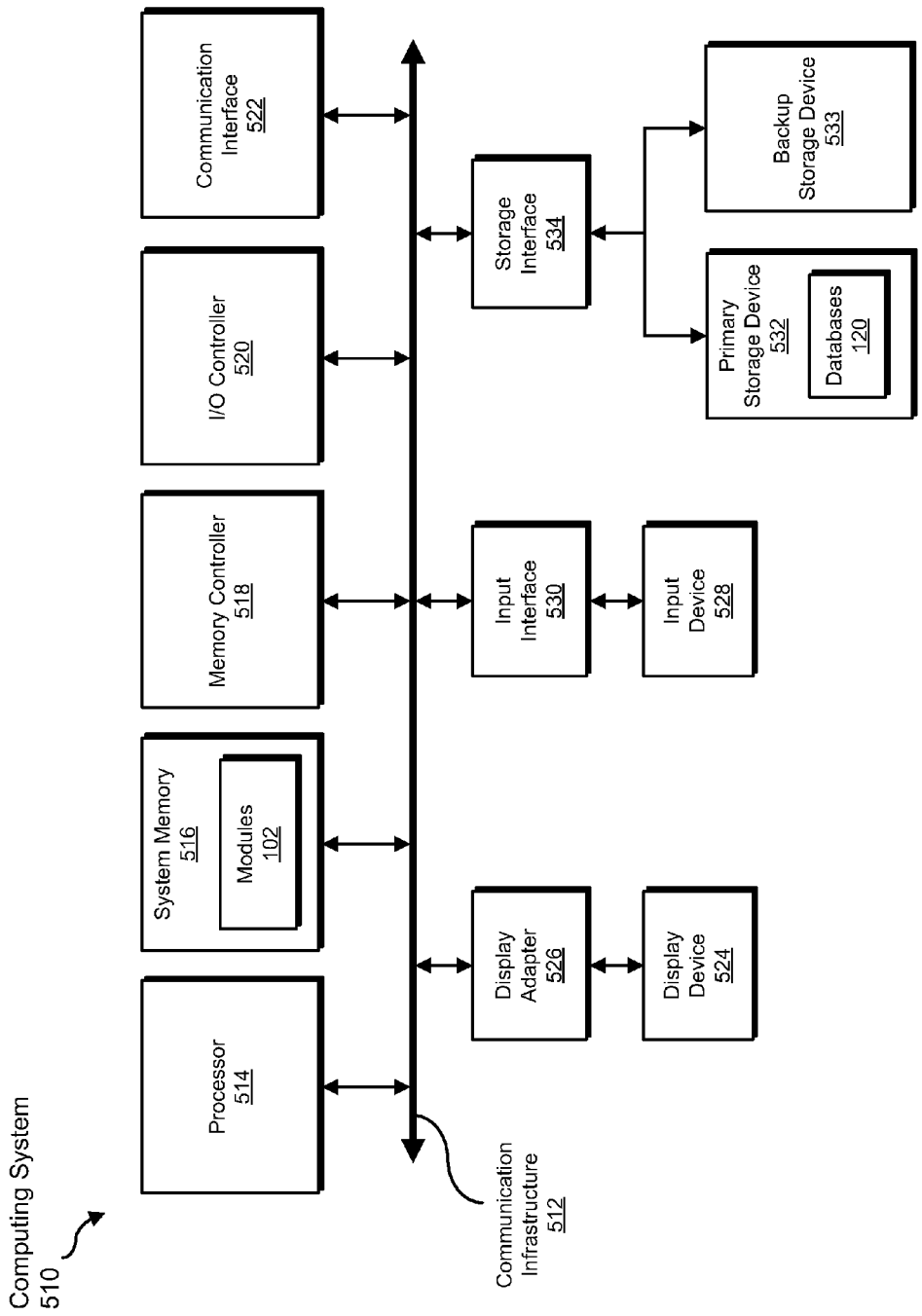
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, mapping, using, booting, updating, deleting, preserving, determining, injecting, reorganizing, writing, and/or changing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, creating, mapping, using, booting, updating, deleting, preserving, determining, injecting, reorganizing, writing, and/or changing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, mapping, using, booting, updating, deleting, preserving, determining, injecting, reorganizing, writing, and/or changing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, mapping, using, booting, updating, deleting, preserving, determining, injecting, reorganizing, writing, and/or changing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, mapping, using, booting, updating, deleting, preserving, determining, injecting, reorganizing, writing, and/or changing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, mapping, using, booting, updating, deleting, preserving, determining, injecting, reorganizing, writing, and/or changing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
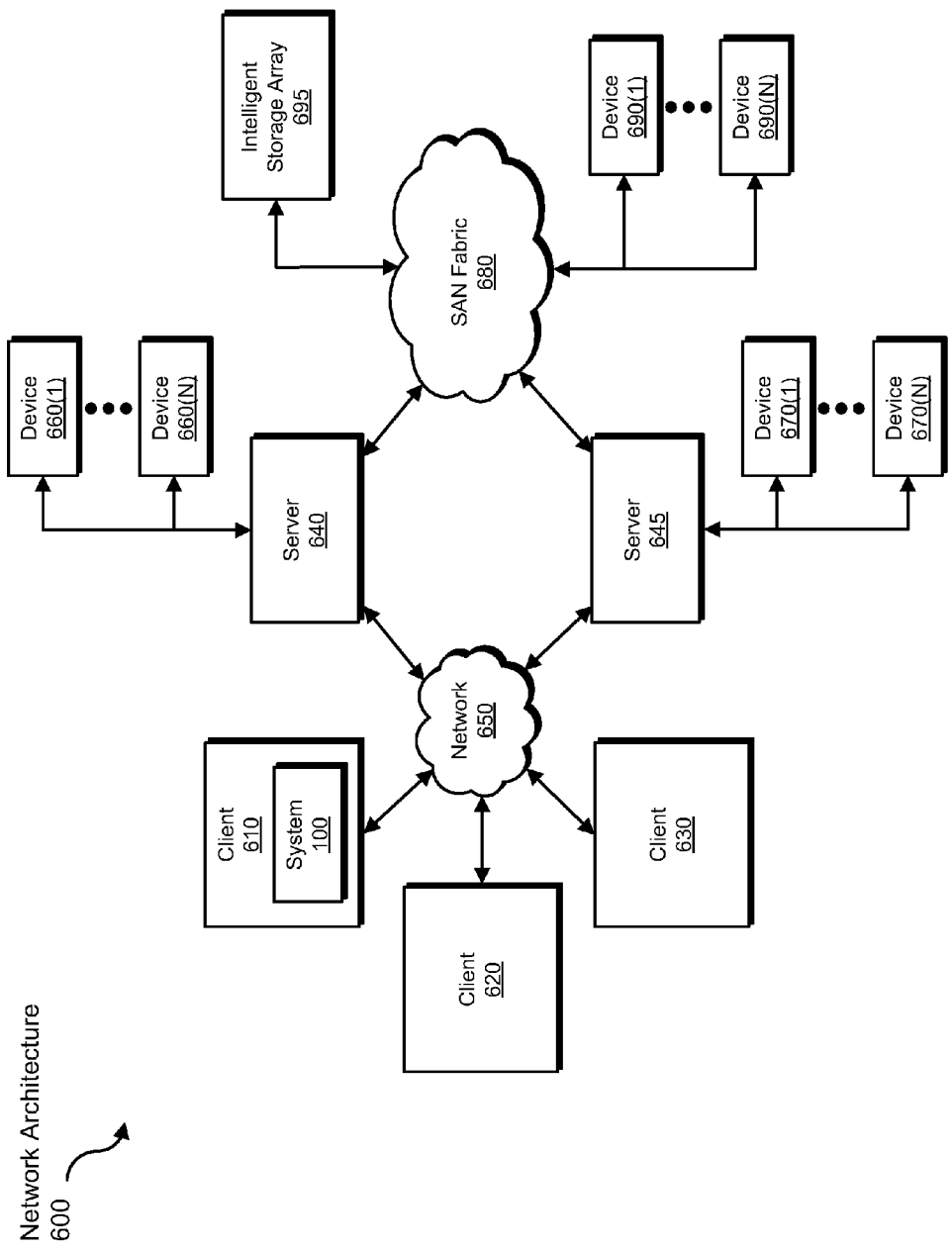
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include one or more components of system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, mapping, using, booting, updating, deleting, preserving, determining, injecting, reorganizing, writing, and/or changing steps disclosed herein. Network architecture 600 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, images may be restored through, from, and/or to a cloud computing environment and/or one or more of modules 102 may operate in a cloud computing environment.

One or more of the software modules described herein may transform data, physical devices, and/or representations of physical devices from one form to another. For example, imaging module 110 may transform data on a target disk into a restored operating system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring images, at least a portion of the method being performed by a computing device comprising at least one processor, the method comprising:
   identifying a request to restore an image to a target disk while a first operating system is running on the target disk;
   creating a file in a first file system of the first operating system;
   mapping a position in the file to a location on the target disk to provide a map that associates the position in the file with the location on the target disk;
   using the map to write at least a portion of the image to the target disk to provide a restored operating system on the target disk.

2. The method of claim 1, wherein:
   the position in the file comprises a file offset;
   the location on the target disk comprises a logical block address;
   the map maps the file offset to the logical block address on the target disk.

3. The method of claim 1, further comprising:
   deleting one or more files from the first file system to create sufficient free space for writing the image to the target disk.

4. The method of claim 1, further comprising:
   preserving a file from the first file system by making the file accessible via a file system of the restored operating system.

5. The method of claim 1, further comprising:
   determining that a hardware driver of the first operating system is compatible with the restored operating system;
   injecting the hardware driver into the restored operating system.

6. The method of claim 1, further comprising:
   reorganizing data on the target disk to create space for file-system-meta-data of the restored operating system after file-system-meta-data of the first operating system and before any other data;
   writing file-system-meta-data of the restored operating system to the space created for the file-system-meta-data of the restored operating system.

7. The method of claim 1, further comprising:
   before booting into the restored operating system, changing a security identifier of the restored operating system.

8. The method of claim 1, wherein:
   creating the file in the first file system of the first operating system comprises creating a file on each volume on the target disk that cannot be locked;
   mapping the position in the file to the location on the target disk comprises mapping positions of each of the files created in the first file system to locations on the target disk;
   using the map comprises using the map to write at least a portion of the image to each volume on the target disk.

9. The method of claim 1, further comprising:
   preventing defragmentation of any location on the target disk to which the image has been written.

10. The method of claim 1, wherein:
    storage extents of the file of the first operating system are not contiguous;
    the image is fragmented as a result of being restored to non-contiguous storage extents;
    the method further comprises commenting out, in a file system of the image being written to the location of the file, storage regions between the storage extents of the file.

11. A system comprising:
    at least one processor;
    an identification module programmed to direct the processor to identify a request to restore an image to a target disk while a first operating system is running on the target disk;
    a file-management module programmed to direct the processor to create a file in a first file system of the first operating system;
    a mapping module programmed to direct the processor to map a position in the file to a location on the target disk to provide a map that associates the position in the file with the location on the target disk;
    an imaging module programmed to direct the processor to use the map to write at least a portion of the image to the target disk at the location of the file on the target disk;
    a boot module programmed to direct the processor to boot from the target disk into a restored operating system included in the image, the restored operating system being different than the first operating system and bootable independent of the first operating system.

12. The system of claim 11, wherein the imaging module is programmed to direct the processor to:
    update a boot record of the target disk to identify one or more partitions comprising the image.

13. The system of claim 11, wherein the file-management module is programmed to direct the processor to:
    delete one or more files from the first file system to create sufficient free space for writing the image to the target disk.

14. The system of claim 11, wherein the imaging module is programmed to direct the processor to:
    preserve a file from the first file system by making the file accessible via a file system of the restored operating system.

15. The system of claim 11, wherein the imaging module is programmed to direct the processor to:
    determine that a hardware driver of the first operating system is compatible with the restored operating system;
    inject the hardware driver into the restored operating system.

16. The system of claim 11, wherein the file-management module is programmed to direct the processor to:
    reorganize data on the target disk to create space for file-system-meta-data of the restored operating system after file-system-meta-data of the first operating system and before any other data;
    write file-system-meta-data of the restored operating system to the space created for the file-system-meta-data of the restored operating system.

17. The system of claim 11, wherein the imaging module is programmed to direct the processor to:
    change a security identifier of the restored operating system.

18. A computer-readable-storage medium comprising one or more computer-executable instructions that, when executed by a computing device, cause the computing device to:
- identify a request to restore an image to a target disk while a first operating system is running on the target disk;
- create a file in a first file system of the first operating system;
- map a position in the file to a location on the target disk to provide a map that associates the position in the file with the location on the target disk;
  - use the map to write at least a portion of the image to the target disk to provide a restored operating system on the target disk while the first operating system is running on the target disk.

19. The computer-readable-storage medium of claim 18, wherein the one or more computer-executable instructions are programmed to cause the computing device to:
- update a boot record of the target disk to identify one or more partitions comprising the image;
- boot from the target disk into the restored operating system included in the image.

20. The computer-readable-storage medium of claim 18, wherein the one or more computer-executable instructions are programmed to cause the computing device to:
- preserve a file from the first file system by making the file accessible via a file system of the operating system included in the image.

* * * * *